United States Patent [19]
Yang

[11] Patent Number: 4,852,475
[45] Date of Patent: Aug. 1, 1989

[54] CONTINUOUS PROCESSING MACHINE ASSEMBLY FOR FRYING RAW MATERIALS

[76] Inventor: Chen-shi Yang, No.2, Lane 1558,Ming Chueng E. Road, Taipei, Taiwan

[21] Appl. No.: 185,890

[22] Filed: Apr. 25, 1988

[51] Int. Cl.[4] .............................................. A47J 37/12
[52] U.S. Cl. ...................................... 99/404; 99/409; 99/427; 99/472; 99/416
[58] Field of Search ................. 99/472, 403, 404, 407, 99/409, 410, 416, 427, 443 C

[56] References Cited

U.S. PATENT DOCUMENTS

| | | | |
|---|---|---|---|
| 2,863,379 | 12/1958 | Ackles | 99/409 X |
| 3,677,171 | 6/1972 | Le Van | 99/443 C X |
| 3,718,485 | 2/1973 | Lankford | 99/472 X |
| 3,889,009 | 6/1975 | Lipoma | 99/443 C X |
| 4,187,771 | 2/1980 | Westover | 99/443 C X |
| 4,430,930 | 2/1984 | Walser | 99/404 X |
| 4,685,386 | 8/1987 | Bezon | 99/404 |

Primary Examiner—Harvey C. Hornsby
Assistant Examiner—K. O'Leary
Attorney, Agent, or Firm—Morton J. Rosenberg

[57] ABSTRACT

A continuous processing machine assembly for frying raw materials and separating the absorbed oil therefrom under low pressure or vacuum through the provision of a frying and oil escapement space properly insulated from outdoors and maintained at a low pressure for continuously frying raw materials and separating absorbed oil therefrom under said circumstance.

12 Claims, 4 Drawing Sheets

CONTINUOUS PROCESSING MACHINE ASSEMBLY FOR FRYING RAW MATERIALS

FIELD OF THE INVENTION

A continuous processing machine assembly for frying raw materials and separating oil and water contained therein under vacuum or low pressure.

BACKGROUND OF THE INVENTION

This invention relates to a frying machine for frying raw materials under low pressure or vacuum, and more particularly to a frying machine assembly with a continuous process for frying raw materials and separating most of the absorbed oil from the fried food.

Conventionally, a variety of the frying machines with continuous processes are used in frying saugages, chicken, or crisps or potato chips, etc. in the open air. It is found disadvantageous that the fried food thus obtained are greasy and the frying oil is oxidized after a short period of usage.

A technique of frying raw materials such as chips of potato, apple, banana and so on under vacuum or low pressure was developed several years ago, where a frying space is maintained at low pressure, which facilitates the vaporization of water contained in the raw materials when heated. This concept is provided for frying the food at lower temperature, and thus to obtain fries substantially retaining the original tastes and colors. It is found that the fries absorb rich oil, which is difficult to be effectively separated from the fries when the fries are shifted to an open air after frying, and become greasy.

SUMMARY OF THE INVENTION

Accordingly, it is an object of the present invention to provide a continuous processing frying machine assembly which will overcome the disadvantageous noted heretofore.

It is another object of the present invention to provide a continuous processing frying machine assembly with improved frying capacity and efficiency.

It is yet another object of the present invention to provide a continuous processing frying machine assembly which produces fries contain little frying oil.

The foregoing objectives are achieved according to this invention through the provision of a frying and oil escapement space properly insulated from outdoors and maintained at a low pressure for continuously frying raw materials and separating the absorbed oil therefrom under the same circumstance.

DETAILED DESCRIPTION OF THE PREFERRED EMBODIMENT

Figure 1:
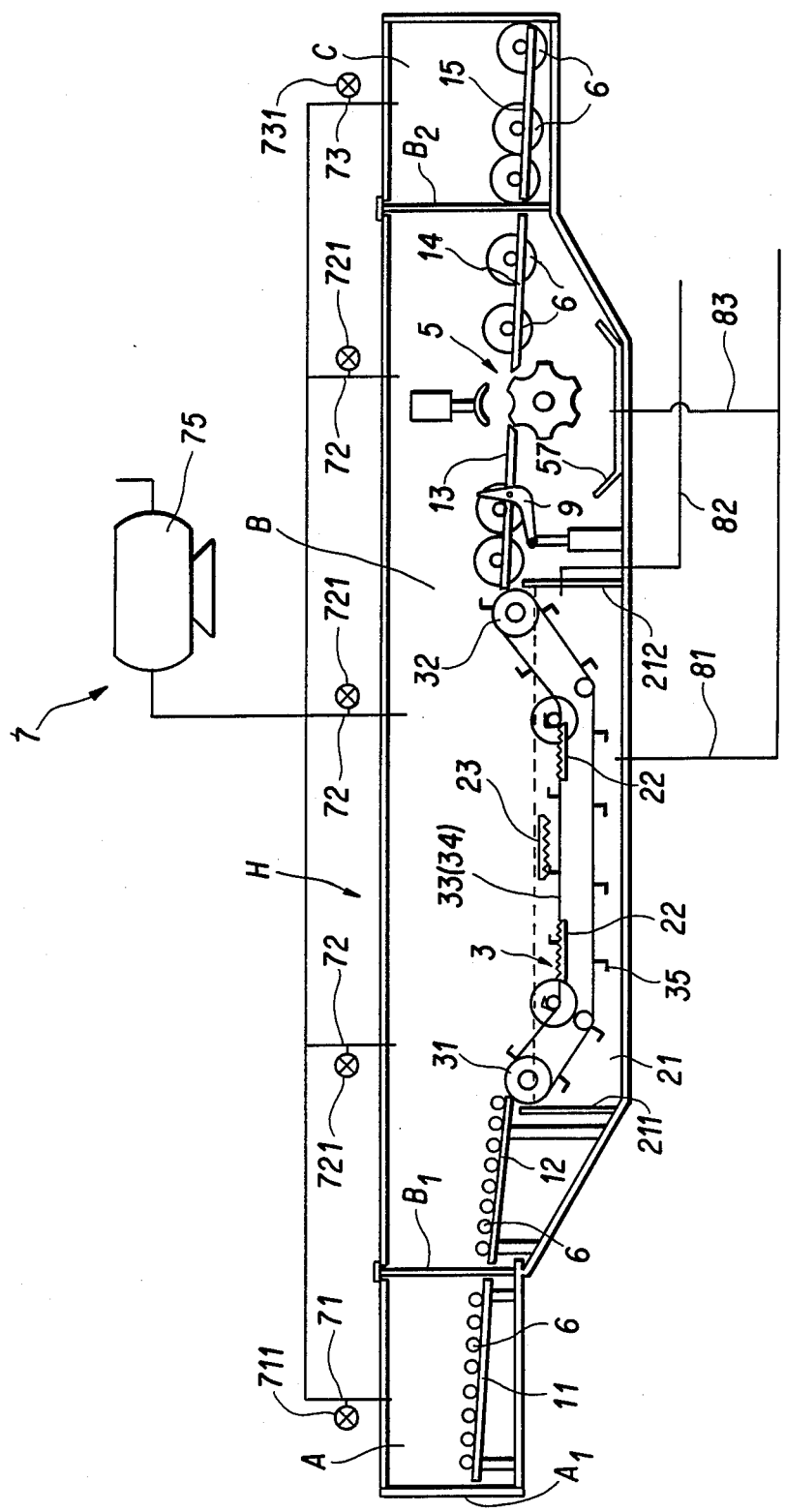
FIG. 1 is a schematic plan view of a continuous processing machine assembly for frying raw materials according to the present invention.

In the embodiment of the present invention, a continuous processing machine assembly for frying raw materials such as chips of potato, apple or banana under vacuum includes, as shown in FIG. 1, an outer housing H with the inner space airtightly separated into a storage compartment A, a take-out compartment C and a frying and oil escapement compartment B inbetween by two gates B1, B2 when closed, a series of inclined rails, divided into sections 11, 12, 13, 14 and 15, secured on a series of aligned vertical legs and longitudinally extending from the compartment A to the compartment C with intervals within said outer housing H, a frying mechanism, disposed in the interval between the second and third sections 12, 13 of the rails, including an oil pool 21, formed in the lower portion of the compartment B, supplied with sufficient heated oil (in which the dotted line indicates the oil level) and a conveyer facility, mostly submerged in the oil, with a plurality of hook members evenly spacedly secured on the conveyer belts or conveyer chains thereof, an oil escapement mechanism 5, disposed in the interval between the third and the fourth sections 13, 14 of the rails, located downstream of the frying mechanism, an air suction apparatus 7 including a low pressure tank 75 communicating with a vacuum pump (not shown) and connected to the compartments A, B, c through a plurality of branch pipes 71, 72, 73, which can be individually controlled manually or remotely by respective valves 711, 721 and 731 disposed therein, an oil supply apparatus including oil tank with heater and filters (those are not shown) connected to the oil pool 21 at a higher portion through a discharge pipe 82 and connected to the oil pool 21 at a lower portion through a suction pipe 81, to which a branch pipe 83, connecting a reservoir 57 disposed under said oil escapement mechanism 5 for collecting separated oil, is connected for withdrawing said collected oil, for e.g. renewing frying oil of the oil pool 21, and a plurality of cylindrical containers 6 filled with raw material to be fried are positioned upon said inclined rails and fed by gravity from the storage compartment A into the frying and oil escapement compartment B to sequentially be fried and separated the absorbed oil from the fried chips, and further fed into the take-out compartment C under vacuum.

The storage compartment A, which communicates with the external environment as the gates A1 being opened and is artightly insulated from outdoors as the gates A1 being closed, houses the first section 11 of said rails inclining downwardly and forwardly.

The frying and oil escapement compartment B, which communicates with the storage compartment A as the gate B1 being opened preferably by elevation and is airtightly insulated from said storage compartment A as the gate B1 being closed, has a central well and houses the second section 12 of the rails terminating at a position slightly over the wall 211 of the oil pool 21, which is defined by surrounding walls 211, 212 and part of the bottom wall, located in the well portion.

At the opposite ends of the oil pool 21 end rollers 31, 32 are secured to the conveyer facility 3 and are driven to rotate by a power source (not shown). Most of the chains 33, 34, upon which a plurality of hook members 35 are disposed for sequentially catching a plurality of the cylindrical container 6 fed from the second section 12 of the rails and retaining them along the frying process, loosely installed thereon are substantially submerged in the oil by gravity. Secured to the side wall (not shown) of the outer housing H are a plurality of rack members 22, 23 being aligned longitudinally and staggered vertically with intervals between them for alternately conducting clockwise and counterclockwise rotations of the cylindrical container 6 along the frying process (as will be described more in details hereinafter).

The third section 13 of the rails is provided for storage of the cylindrical containers 6, and loading the fries, delivered by the conveyer facility 3. At least one feeding arm 9 is pivotally interposed on the rails 13 to catch the delivered cylindrical containers 6 and sequentially releasing them to the oil escapement mechanism 5 separating absorbed oil by centrifugal force. After the oil separation treatment, the cylindrical containers 6 are suquentially delivered to the forth section 14 of the rails and further fed into the take-out compartment C when the low pressures of the inner spaces of the frying and oil escapement compartment B and the take-out compartment C are equal the gate B2 is elevated to an open condition.

The take-out compartment C houses the fifth section 15 of the rails and communicates with the external environment when the gate C1, being similar to the gate A1, is opened to take out the cylindrical containers 6 stored therein, simultaneously, gate B2 is closed to airtightly insulate the compartment C from the compartment B for preventing the compartment B from destroying the vacuum condition.

Figure 2:
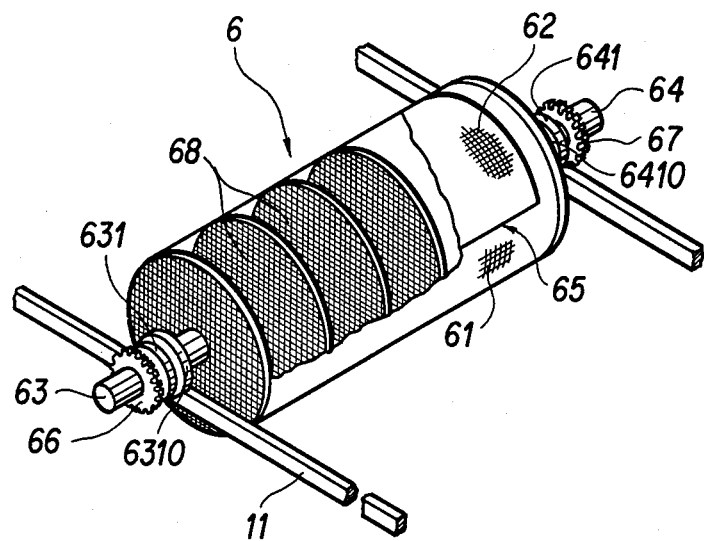
FIG. 2 is a perspective view of a cylindrical container and related rails.

Referring to FIG. 2, the cylindrical container 6 comprises a cylindrical outer case 61 made of heat resistant material such as wire net, which facilitates oil communication such as the introduction of the heated oil to submerge and fry the raw material contained therein or oil escapement therefrom, and having a port hole (not shown), over which a corresponding cover 62 and its lock means 65 are provided for temporarily and securely covering the port hole. A plurality of circular partition members 68, also made of wire net and evenly spaced, are fittingly fixed in the chamber. By so doing, the chamber is divided into a plurality of smaller compartments for evenly destributing the raw material therein that prevents the material from combining into masses and results in uneven frying. Two lateral shafts 63, 64, axially projecting from the side walls, are provided. Rotatably sleeved on the shafts are respective ring members 631, 641, having circumferential grooves 6310, 6410 formed in the peripheries thereof for fittingly positioning on the rails, and rigidly sleeved on the shafts are respective gears 66, 67. It is to be noted that the compartments within the chamber can be arranged in a variety of other geometric formats.

Figure 3:
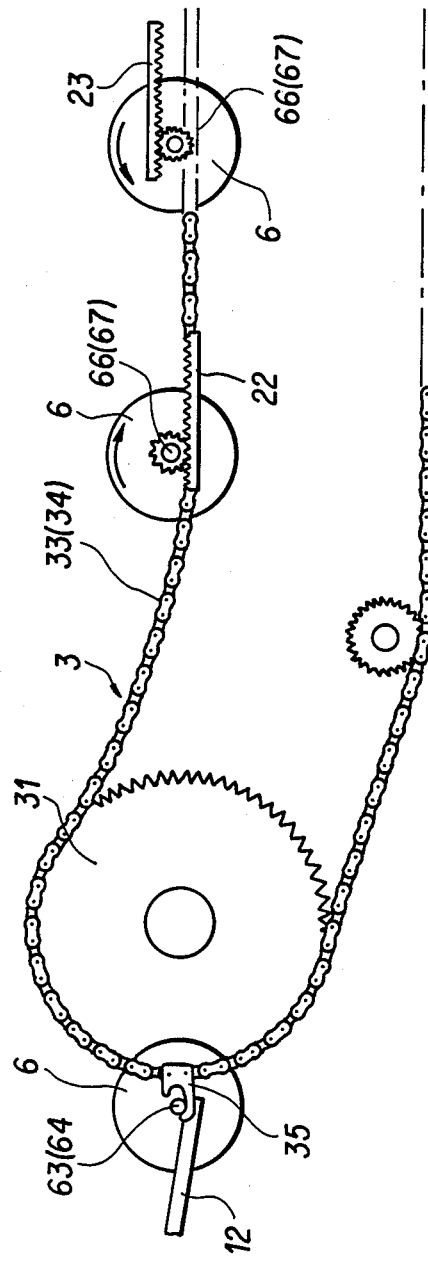
FIG. 3 shows schematically a portion of conveyer facility and related rail, cylindrical containers and rack members.
Figure 5:
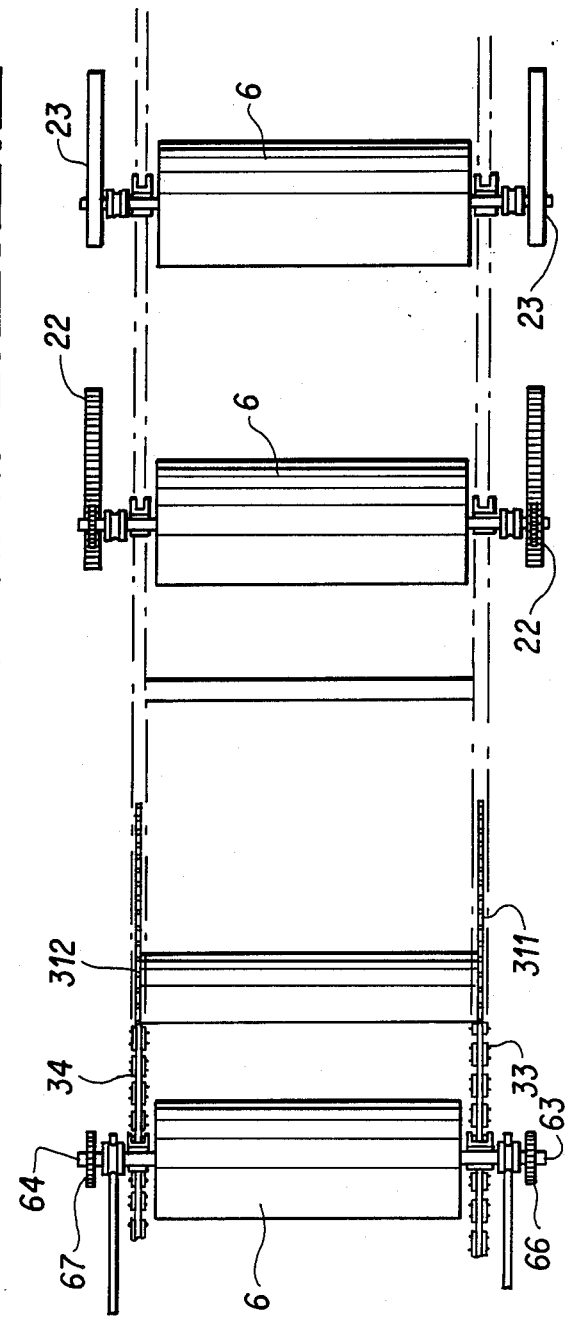
FIG. 5 is a schematic top view of FIG. 3.
Figure 4:
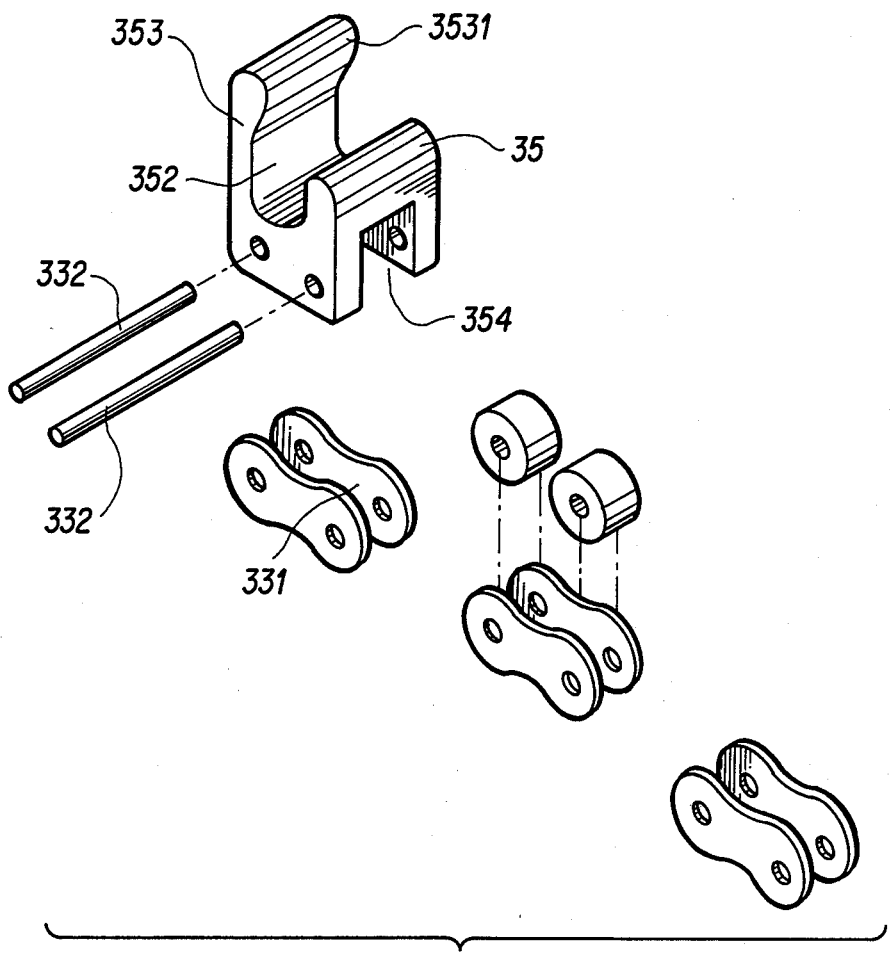
FIG. 4 is an exploded and perspective view of a hook member and links.

Referring to FIGS. 3, 4 and 5, the conveyer facility 3 includes two end rollers 31, 32, each of which consists of a shaft coaxially interconnecting two spaced and corresponding sprocket wheels, spacedly located at the opposite ends of the oil pool 21. Parallelly installed on the sprocket wheels of the end rollers 31, 32 are endless chains 33, 34, upon which a plurality of hook members 35 are longitudinally spacedly and transversely correspondingly disposed. Said hook members 35, as particularly shown in FIG. 4, includes a groove 352 running transverse and formed beside a catching projector 353, which projects upward and has a convex surface inwardly located on the upper portion thereof. This catching and restraining the container 6 by the shafts, and a tunnel 354, formed thereunder, suitable for riding on a selected link 331 of the chains, where pins 332 are pressed to secure the hook member 35 thereon.

At least a series of rack members 22, 23 are arranged with intervals beyond the chains 33 or 34, in which the rack members 22, having gear teeth formed in the top surfaces, are to be tangentially engaged with the lowermost portion of the gear 66 or 67 rigidly sleeved on the shaft 63 or 64 of the cylindrical container 6 to conduct clockwise rotations, and, vice versa, the rack members 23, having gear teeth formed in the bottom surfaces, are to be tangentially engaged with the top portion of the gear 66 or 67 to conduct counterclockwise rotations of the cylindrical containers 6. Rack members 22 and 23 are alternately arranged for periodically conducting clockwise and couterclockwise rotations of the cylindrical containers 6 during displacement through the frying process.

Figure 6:
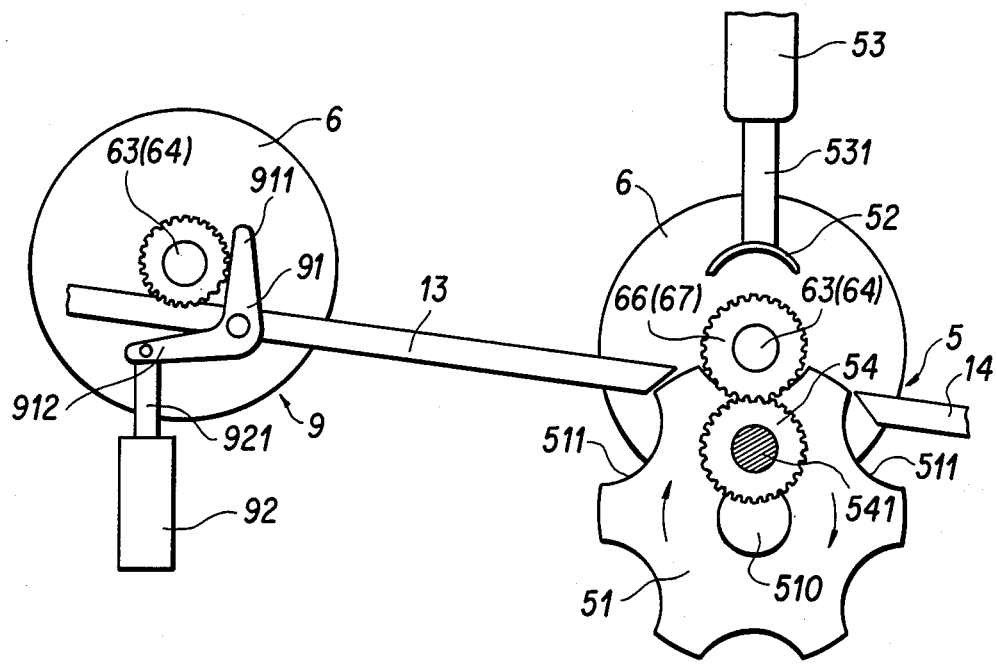
FIG. 6 is a schematic elevation view showing an oil escapement mechanism and related rails including a feeding arm.

Referring to FIG. 6, the oil escapement mechanism 5 includes supporting wheels 51, each of which has a plurality of concave recesses 511 evenly formed in the periphery thereof for receiving the shaft 63 or 64, coaxially interconnected by a shaft 510 and driven to rotate by a power source (not shown) at a predetermined angle e.g. 60° to transversely maintain a pair of the concave recesses 511 at the top positions, two arcuate ends 52, each of which is disposed at the end of an actuating rod 531 of a hydraulic actuating unit 53 suspended downward, are provided for seizing the shafts 63, 64 by the rings rotatably sleeved thereon, and at least a drive gear 54, which is rigidly sleeved on a shaft 541 and driven to rotate at relatively high rotating speed such as 300 to 400 rpm by a power source (not shown), engaged with a gear 66 or 67 of the cylindrical container 6 with its shafts trasversely positioned on the top concave recesses and drive it to rotate at same rotating speed for a period of about 3 to 10 minutes to separate the absorbed oil from the fries loaded in the container 6 by centrifugal force.

There are feeding arms 91 disposed transversely at interval on the rails 13 upstream of said oil escapement mechanism 5 and apart from their respective terminations to catch the cylindrical container 6, delivered by the conveyer facility 3, by its lateral shafts 63, 64 and releasing it to said oil escapement mechanism 5. Each feeding arm 91 is forked and has prongs 911 and 912 which form substantially a right angle between them, and is mounted pivotally on the rail 13 and connected to an actuating rod 921 of a hydraulic actuating unit 92 properly disposed. The actuating rods 921 of the hydraulic units 92 properly mounted synchronously move the feeding arms 91 between a catching position and a releasing position. When the feeding arms 91 are in the catching position, the prongs 911 project from the plane of inclination of the rails 13 to stop the cylindrical container 6. When the feeding arms 91 are in the releasing position, the prongs 911 and 912 of the feeding arms 91 turn clockwise, and release the container 6 to continue rolling along the rails 13 onto the top concaves 511 of the supporting wheels 51 of the oil escapement mechanism 5.

The operation of the invention is to be described as follow:

A plurality of cylindrical containers 6 filled wtih raw material are positioned open the rails 11 through the opening doorway (as the gate A1 is opened while the gate B1 is closed to prevent the compartment B from spoiling vacuum. After completion of said storage, gate A1 is then closed where compartment A is completely insulated, and the air suction therefrom is conducted through branch pipe 71. The gate B1 is allowed to be opened by elevation for feeding said containers 6 onto the rails 12 located in the copartment B when the low pressures of the compartment A and B are equal.

A plurality of paired hook members 35, longitudinally spacedly and transversely correspondingly secured on the chains, are endlessly conveyed to sequentially catch upwardly the containers 6 residing at the terminations of the rails 12 by the lateral shafts 63, 64, which are further to rotatably received in the grooves 352 and restrained by the catching projectors 353 of the hook members 35. The received cylindrical containers 6 gradually submerge into the oil by gravity after conveying past the end roller 31, and the raw material loaded therein is fried under vacuum or low pressure by the introducing heated oil.

Along the frying process, clockwise and counterclockwise rotations of the containers 6 are alternately conducted with intervals for damping the prior rotation to stop by the oil before the start of the reverse rotation. Thus prevents the raw material loaded in the containers 6 from combinating into masses, and is evenly fried.

The cylindrical containers 6 loading fried chips are sequentially delivered up to the rails 13 and released by the feeding arm 91 one after another to the oil escapement mechnism 5 for separating absorbed oil from the fries just fried under vacuum or low pressure. Said cylindrical containers 6 are fed to the rails 14 by gravity after the treatments of oil separation. The opening operations of the gates B2 and C1 are also alternately controlled. It means that either of the gates B2 or C1 is opened, the other gate should be closed to prevent the compartment B from spoiling vacuum. When the low pressures of the compartments B and C are equal, the gate B2 is allowed to be opened by elevation for the delivery of a group of cylindrical containers 6, which can be take out when the compartment B is insulated from the compartment C.

Obviously, many modifications and variations of the present invention are possible in light of the above teachings. It is to be understood therefore, that within the scope of the appended cliams, the invention may be practiced otherwise than as specially described herein.

What is claimed is:

1. A continuous processing machine assembly for frying raw materials comprising:
    an outer housing having a pair of airtight gates locationally positioned at an entrance section and an egress section respectively; a plurality of sectionally disposed rails longitudinally extending from said entrance section to said egress section of said outer housing and said rails being downwardly inclined;
    a frying mechanism disposed in an interval between two sections of said rails including an oil pool containing heated oil and conveyer facility means having spaced end rollers and endless conveyer belts installed parallel to each other on said end rollers for displacing said raw materials;
    a plurality of pairs of hook members longitudinally spacedly and transversely correspondingly secured on said conveyer belts;
    an oil escapement mechanism disposed in an interval between two sections of said rails downstream of said frying mechanism including seizing means and drive gear means for separating said oil from said raw material;
    an air suction apparatus with pipes connected to said outer housing; and
    a plurality of cylindrical containers filled with well-prepared raw material, each of said containers including a cylindrical outer case formed of wire net and having a port hole, a corresponding cover, and two shafts axially projecting from the side walls of the outer case, each of said shafts having a gear rigidly sleeved thereon.

2. A continuous processing machine assembly for frying raw materials as claimed in claim 1 further comprising oil supply means for providing oil to and withdrawing oil from said oil pool, having a discharge pipe and a suction pipe respectively connected to an upper section and lower section of said oil pool.

3. A continuous processing machine assembly for frying raw materials as claimed in claim 1 further comprising a plurality of upper and lower rack members, longitudinally arranged with intervals therebetween and being secured to the side walls of said oil pool, said racks having gear teeth for engaging said gears rigidly sleeved on each of said shafts of said container to provide rotation of said container during longitudinal displacement of said container throughout a frying process.

4. A continuous processing machine assembly for frying raw materials as claimed in claim 3 wherein said lower rack members have gear teeth formed in a top surface and are arranged to be tangentially engaged with a lowermost portion of said gears rigidly sleeved on the shaft of a container for providing clockwise rotations thereof during said frying process.

5. A continuous processing machine assembly for frying raw materials as claimed in claim 3 wherein said upper rack members have gear teeth formed in a bottom surface and are arranged to be tangentially engaged with a top portion of said gears sleeved on the shafts of a cylindrical container for providing counterclockwise rotations thereof during said frying process.

6. A continuous processing machine assembly for frying new materials as claimed in claim 3 wherein said lower rack members have gear teeth formed in top surfaces to be tangentially engaged with a lowermost portion of said sleeved gear, and said upper rack members, have gear teeth formed in bottom surfaces thereof to be tangentially engaged with a top portion of said sleeved gear of said cylindrical container, said racks are alternately arranged to periodically conduct clockwise and counterclockwise rotations of the cylindrical container during travel through said frying process.

7. A continuous processing machine assembly for frying raw materials as claimed in claim 1 wherein each said hook member comprise a transverse groove formed beside an upwardly directed catching projector, having a convex surface inwardly located in a top portion thereof, and a tunnel formed longitudinally in a bottom portion for riding on a link of the chain belts of the convey or facility, said links being secured to said hook members by pressed pins.

8. A continuous processing assembly for frying raw materials as claimed in Claim 1 wherein the seizing means of the oil escapement mechanism includes:
    two spaced supporting wheels, each of which has a plurality of concave recesses formed around the periphery, coaxially interconnected by a shaft and driven to rotate by a power source at a predetermined angle to maintain a pair of concave recesses at top positions;

a pair of arcuate end members, disposed on the ends of respective actuating rods of hydraulic actuating units suspended downward, opposed to said top concave recesses of said supporting wheels to be actuated to seize the shafts of the container cooperatively with the opposed top concave recesses.

9. A continuous processing machine assembly for frying raw materials as claimed in claim 1 wherein the outer housing further comprises a storage compartment located at the entrance section and temporarily separated by an airtight gate and connected with said suction apparatus, further having a second airtight gate and housing an addition a series of rails upstream of and aligned with said series of rails.

10. A continuous processing machine assembly for frying raw materials as claimed in claim 9 wherein opening operations of the airtight gates are alternately controlled.

11. A continuous processing machine assembly for frying raw materials as claimed in claim 1 wherein the outer housing further comprises a take-out compartment located at the egress section and temporarily separated by an airtight gate and connected with said suction apparatus, further having a second airtight gate and housing an additional a series of rails downstream of and aligned with said series of rails.

12. A continuous processing machine assembly for frying raw materials as claimed in claim 11 wherein opening operations of the airtight gatesare alternately controlled.

* * * * *